May 3, 1927.
J. ST. C. WERNIG
1,627,218
AUTOMOBILE BUMPER
Filed Aug. 1, 1925
2 Sheets-Sheet 2
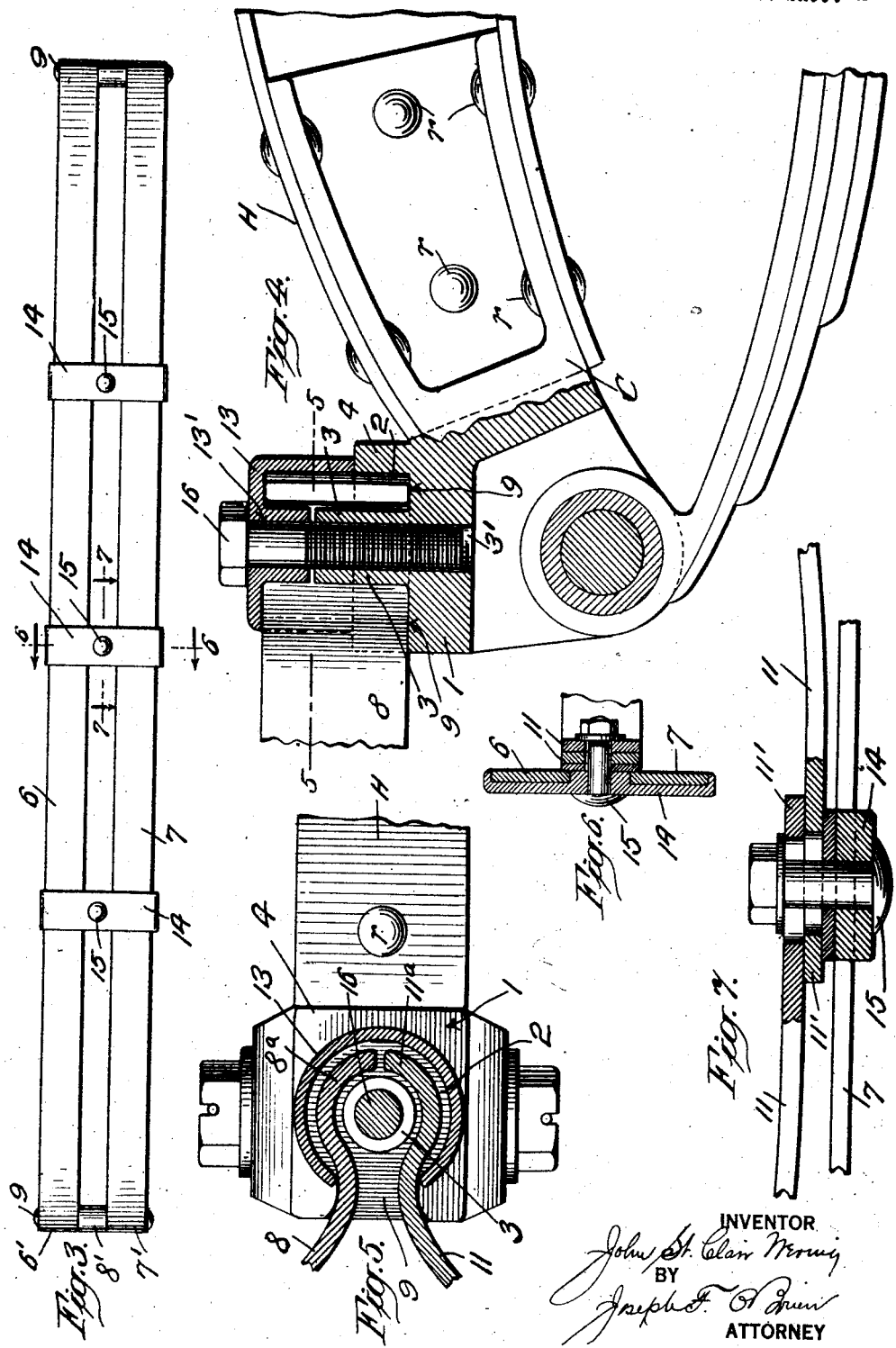
INVENTOR
John St. Clair Wernig
BY
Joseph F. O'Brien
ATTORNEY Patented May 3, 1927.

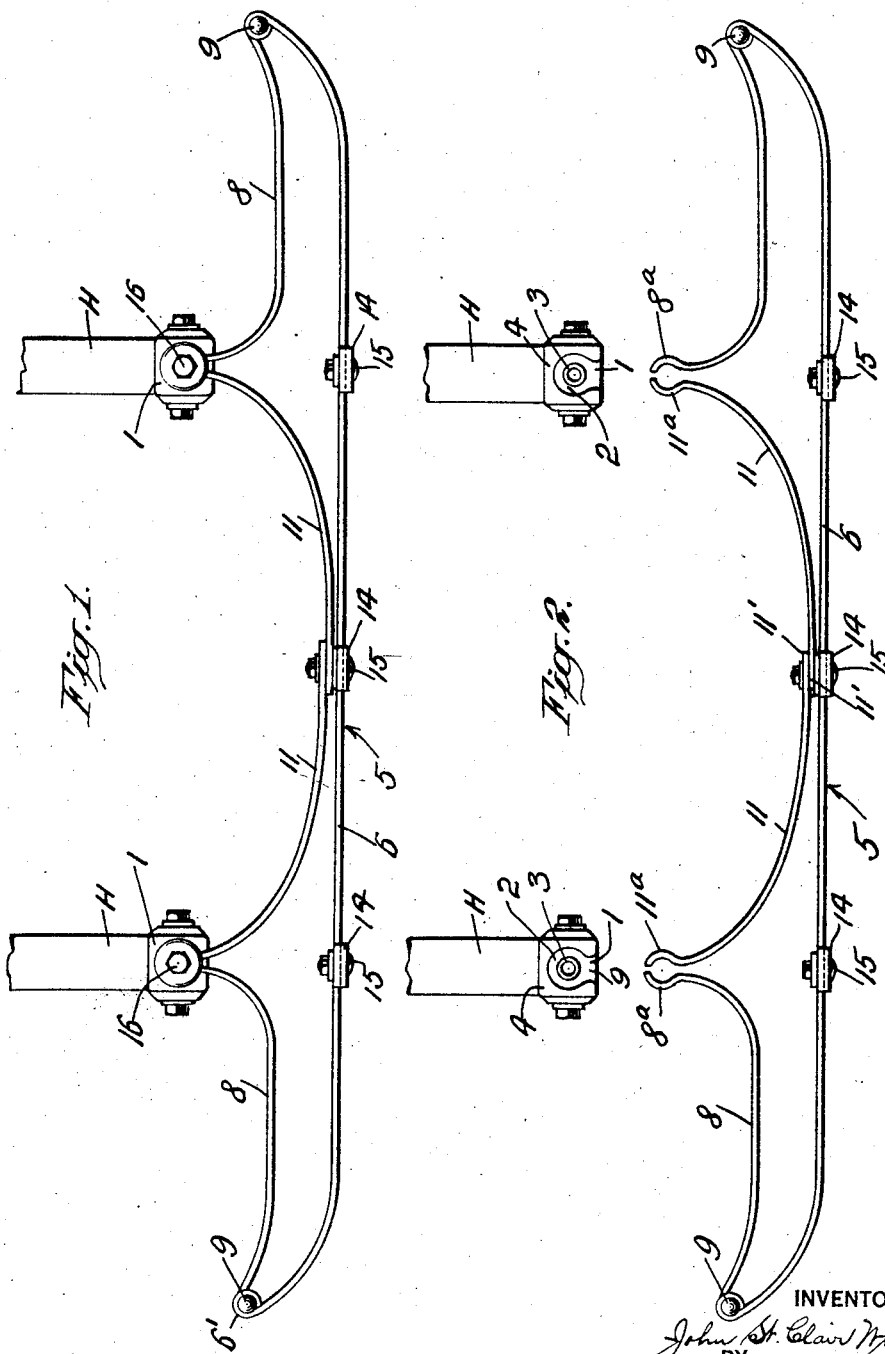

1,627,218

UNITED STATES PATENT OFFICE.

JOHN ST. CLAIR WERNIG, OF BROOKLYN, NEW YORK.

AUTOMOBILE BUMPER.

Application filed August 1, 1925. Serial No. 47,398.

This invention relates to improvements in automobile bumpers.

One of the objects of this invention is to provide an automobile bumper which may be mounted upon the horns of an automobile chassis with increased facility and expedition and when so mounted will be securely and rigidly maintained in position at a proper height; and another object of the invention is to provide a bumper which will be capable of use only with a particular type of mounting, and vice-versa so as to enable a car manufacturer to provide in advance for a special form of bumper to control the character, type and sale of the bumper and fitting to be used on his car without making the bumper standard equipment and thus adding to the sale price of the car and also to promote uniformity in appearance of his cars as well as to afford proper bumper protection therefor.

With these and other objects in view, the invention comprises the combination of members and arrangement of parts so combined as to co-act and cooperate with each other in the performance of the functions and the accomplishment of the results, herein contemplated, and comprises in one of its adaptations the species or preferred form illustrated in the accompanying drawings, in which:—

Fig. 1 is a plan view showing my improved bumper mounted on the horns of an automobile chassis;

Fig. 2 is a similar view showing my improved bumper separated from the mounting;

Fig. 3 is a front elevation of my preferred form of bumper;

Fig. 4 is a side view partially in the section of one of the horns of an automobile chassis showing my preferred method of mounting;

Fig. 5 is a section on the line 5—5 of Fig. 4 looking downwardly;

Fig. 6 is a section on the line 6—6 of Fig. 3 looking in the direction of the arrow; and Fig. 7 is a section on the line 7—7 of Fig. 3 also looking in the direction of the arrow.

Referring now to these drawings, which illustrate a preferred embodiment of my invention, H, H are the conventional outwardly-inclined frame ends or horns of a motor vehicle chassis. The other parts of the automobile are not shown in the drawings as they form no part of the present invention, which in its preferred form comprises the combination with a bumper of fittings, each composed of two complementary parts, one of which is formed integrally with the bumper and the other of which is formed unitarily with the car chassis.

The horns H, H are each of channel cross-section, as indicated in Fig. 4, and carry at the front ends thereof, a relatively heavy spring-connector member C usually comprising a drop forging which is riveted to the horns by rivets $r$ and greatly reinforces the relatively thin metal frame ends.

In the preferred form of my invention the drop forging C has integrally formed therewith, an extension portion 1 projecting forwardly and upwardly therefrom. This extension 1 may be of any suitable form and, as shown, comprises a square, solid block having a depressed circular socket 2 preferably having a horizontal mounting floor 9 and surrounding a centrally-disposed and integral post 3 which is preferably hollow for a purpose which will be hereinafter explained. Said socket is in turn surrounded by a socket wall 4. I thus form integrally with the frame or chassis of the car a mounting base or fitting portion comprising a vertically-disposed post and socket member and in carrying out my invention, I form integrally with the bumper, a complementary part of said fitting. As illustrated, my bumper comprises, as shown, an impact-member 5, which may be of any conventional form, but which in the preferred embodiment comprises parallel bars 6 and 7 connected and preferably pivoted at opposite ends to rear bars 8 which, as shown, are connected between parallel bars 6 and 7 by the provision of eyes 6' and 7' at the opposite ends of said bars 6 and 7 and the provision on the outer ends of each of the bars 8 of an eye 8', a king bolt or pin being passed through, the three eyes to connect and pivot the same together. The opposite, inner end of each of the rear bars 8 is provided with a complementary locking bend 8ª adapted, when the bumper is in mounted position, to fit within the socket 2 and to partially surround the post 3.

In the preferred form of my invention shown, the bumper is also provided with central rear bars 11 each of which engages the impact bar at its central portion and, as shown, are connected thereto by a clamp 14. The opposite end of each of the bars 11 is likewise provided with a complementary locking bend portion 11ª.

It will be seeen, therefore, that in the preferred embodiment, the two parts 8ª and 11ª jointly comprise an eye formation which is split and has its parts integrally formed on rear or back bars of the bumper and when the bumper is mounted in position, these two parts will fit into the socket 2 and surround the post 3.

It will be seen, furthermore, that by forming a part of the eye formation on one of the rear bars 8 and another part on the opposite rear bar 11, I am enabled to compensate for any slight variation in the distances between the horns H on cars of the same or different makes and also to compensate for slight variations in the manufacture of bumpers. Furthermore, when the rear bars 11 have their ends 11' overlapping as shown, considerable additional adjustment may be obtained. The eye formation thus formed as an integral part of the bumper is mounted on the base or mounting member formed on the upper surface of the horns of the car and preferably formed as an integral upward extension of the spring-connector forging C, as aforesaid. In order to lock the eye formation comprising the mounting part 8ª and 11ª within the socket 2, the post 3 is preferably made hollow and I fit over the eye formation, comprising the ends 8ª and 11ª, a cap 13 which is fastened in place by a bolt 16 which preferably passes through a bore 13' in the cap 13 and also passes through a threaded bore 3' in the post 3.

It will be seen that when the cap 13 is fastened in place by the bolt 16, the eye formation formed by the locking parts 8ª and 11ª on the rear bars of the bumper will be securely and positively mounted in horizontal position on a horizontal base; that a bumper will be provided in which complementary parts of a mounting will be unitary parts of the car and bumper respectively; that an automobile bumper is provided which may be mounted upon the horns of an automobile chassis with increased facility and expedition and when so mounted will be securely and rigidly maintained in true horizontal position at a proper height and that sagging and uneven mounting of opposite ends is avoided; that a bumper is produced which will be capable of use only with a particular type of mounting and vice versa so as to enable a car manufacturer to provide in advance for a special form of bumper and thus to promote uniformity in appearance of his cars as well as to afford proper bumper protection therefor; that a mounting fitting is provided a part of which is formed as a unitary part of the car chassis or horns and another part is an integral and unitary part of the bumper; also that the usual trouble encountered in mounting a bumper on a chassis is avoided; that the provision of split eyes and preferably vertically-disposed split eyes on the rear bars of the bumper provides an economical and neat method of mounting which may be utilized to cooperate with a vertical post or socket formed on the horns and preferably on the spring-connector forging; and that the use of a mounting block with a horizontal floor on the top surface of the horns provides an ideal place for the mounting of a bumper, insures alignment of both ends and prevents sagging.

Having described my invention, I claim:—

1. A support for automobile bumpers embodying rear supporting members having two pairs of terminal ends, the ends of the members of each pair converging toward each other and jointly forming a split eye-formation, and a single supporting element on each frame-end adapted to conjointly engage the said split portions of each eye-formation.

2. A support for automobile bumpers embodying rear supporting members having two pairs of terminal ends, the ends of the members of each pair converging toward each other and jointly forming a split eye-formation, and a single supporting element on each frame end comprising a mounting member provided with a substantially cylindrical socket having a flat horizontal mounting floor, and means for clamping said split eye-formation within said socket on said floor.

3. A bumper support embodying a plurality of complementary members one of which comprises an eye-formation composed of two split parts formed on the bumper and the other of which constitutes an engaging part for said eye-formation formed as a unitary part of the car chassis, and being of substantially cylindrical conformation.

4. A bumper support embodying a plurality of complementary members one of which comprises an eye-formation composed of two split parts formed on the rear bars of the bumper and the other of which constitutes an engaging part for said eye-formation formed as a unitary part of the spring connector forging of the car chassis.

5. A bumper support embodying a plurality of complementary members one of which comprises an eye-formation composed of two split parts formed on the rear bars of the bumper and the other of which constitutes an engaging part for said eye-formation formed as an extension on the upper surface of the frame-ends and as a unitary part of the spring connector forging of the car chassis.

6. A bumper support embodying a plurality of complementary members one of which comprises an eye-formation composed of two split parts formed on the rear bars of the bumper and the other of which constitutes an engaging part for said eye-formation formed as an extension on the upper surface of the frame-ends and as a unitary part of the spring connector forging of the car chassis, said extension having a mounting base and means for clamping said eye-formation to said base.

7. A bumper support embodying a plurality of complementary members one of which comprises an eye-formation composed of two split parts formed on the rear bars of the bumper and the other of which constitutes an engaging part for said eye-formation formed as an extension on the upper surface of the frame-ends and as a unitary part of the spring connector forging of the car chassis, said extension having a mounting base and means for clamping said eye-formation to said base, a socket in said extension and means for locking said eye-formation within said socket.

8. A bumper support embodying a plurality of complementary members one of which comprises an eye-formation composed of two split parts formed on the rear bars of the bumper and the other of which constitutes an engaging part for said eye-formation formed as an extension on the upper surface of the frame-ends and as a unitary part of the spring connector forging of the car chassis, said extension having a mounting base and means for clamping said eye-formation to said base, comprising a post on said extension and means for locking said eye-formation to said post.

9. A bumper support embodying a plurality of complementary members one of which comprises an eye-formation composed of two split parts formed on the rear bars of the bumper and the other of which constitutes an engaging part for said eye-formation formed as an extension on the upper surface of the frame-ends and as a unitary part of the spring connector forging of the car chassis, said extension having a mounting base and means for clamping said eye-formation to said base, comprising a post on said extension and a socket surrounding said post, and means for locking said eye-formation within said socket and surrounding said post.

10. A bumper support embodying a plurality of complementary members one of which comprises an eye-formation composed of two split parts formed on the rear bars of the bumper and the other of which constitutes an engaging part for said eye-formation formed as an extension on the upper surface of the frame-ends and as a unitary part of the spring connector forging of the car chassis, said extension having a mounting base and means for clamping said eye-formation to said base, comprising a post on said extension and a socket surrounding said post, a cap fitting over said post and socket and a bolt for locking said cap to said extension to fasten the bumper in place.

11. A bumper support embodying a plurality of complementary members one of which comprises an eye-formation composed of two split parts formed on the rear bars of the bumper and the other of which constitutes an engaging part for said eye-formation formed as an extension on the upper surface of the frame-ends and as a unitary part of the spring connector forging of the car chassis, said extension having a mounting base and means for clamping said eye-formation to said base, comprising a post on said extension and a socket surrounding said post, a cap fitting over said post and socket and a bolt for locking said cap to said extension to fasten the bumper in place, said socket having a horizontal base on which said eye-formation rests.

In witness whereof, I have signed my name to the foregoing specification.

JOHN ST. CLAIR WERNIG.